UNITED STATES PATENT OFFICE 2,496,255

AZO DYES

William Henry von Glahn, Loudenville, N. Y., assignor to General Aniline & Film Corporation, New York, N. Y., a corporation of Delaware No Drawing. Application April 2, 1946, Serial No. 659,160

1 Claim. (Cl. 260—192)

This invention relates to a new class of water insoluble azo dyes; more particularly it relates to azo dyes of the general formula:

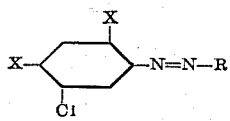

In this formula R stands for the radical of an arylamide of an o-hydroxy carboxylic acid compound having more than two fused rings one of which is selected from the group consisting of aromatic and heterocyclic rings and the others are aromatic rings, and the X's stand for radicals of the group consisting of methoxy and ethoxy radicals.

These new dyestuffs which can be made in substance or on the fiber have high tinctorial values and exceptional fastness properties. They are obtainable by coupling the diazo compound of an amine of the general formula:

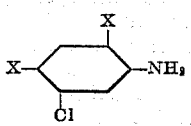

wherein the X's are alkoxy radicals of the group consisting of methoxy and ethoxy groups with an arylamide of an o-hydroxy carboxylic acid compound of the class defined by R in the first above formula which is free of water solubilizing groups such as SO₃H and COOH groups. In the production of the pigment, the 1.5-dialkoxy-2-amino-4-chlorobenzene or 5-chloro-2.4-dialkoxy-aniline is diazotized in the usual manner and after clarification of the diazo solution it is added to a buffered alkaline solution of the coupling component. When coupling is complete, the reaction solution is acidified and filtered. The resulting pigment is then washed acid free and dried.

For the development of the color on the fiber, textiles of natural or regenerated cellulose or animal fibers may be employed. Of particular interest are cotton and cellulose acetate fibers. Any of the usual ice color processes may be used in the development of the color. In one such process a printing paste is prepared by mixing a diazo amino compound, derived by condensing the diazo of the 5-chloro-2.4-dialkoxyaniline with an amino compound, such as sarcosine, methyl taurine, 2-amino-5-sulfobenzoic acid, proline, N-methylglucamine or other amino compound known to be suitable for such purposes, with a coupling component of the class represented by R in the above formula which is free from water solubilizing groups and adding to the mixture sodium hydroxide, Cellosolve, a thickening agent such as starch or gum tragacanth and water. If desired, such other textile assistants as Turkey red oil, dispersing agents and solvents may also be added. The fabric is printed by application of the paste in the desired design, drying and introducing the treated fabric to an ager where it is subjected for a short time to the action of steam containing the vapors from volatile organic acid or acids, such as formic and acetic acids. As is well known in this type of printing, the acid vapor splits the amine stabilizer from its combination with the diazo compound and permits the latter to couple with the coupling component present in the printing paste. The design is thus developed in the color of the azo dye resulting from the coupling reaction. The fabric is then rinsed, washed and dried. Alternative methods of development may be employed, such as introducing the printed fabric to a bath containing an acid, such as formic acid, acetic acid or oxalic acid, which bath may also contain other assistants and penetrants.

Whether the color is developed on a fiber or whether it is produced in substance as a pigment, it is to be understood that any arylamide of an o-hydroxy carboxylic acid compound of the class defined below which has no water solubilizing groups, can be used as coupling component with the diazo derivative of the 5-chloro-2.4-dialkoxyaniline. This class of coupling components may be represented by the formula:

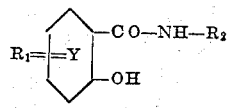

wherein $R_1$ represents the radical of a compound containing at least two fused rings one of which is selected from the group consisting of aromatic and heterocyclic rings and the others are aromatic rings which radical is fused to the nucleus Y at adjacent positions as indicated by the free bonds, and R2 represents an aryl radical. As examples of such compounds, there may be mentioned:

1. Bis(3-hydroxy-2-anthracene carboxy)-3.3'-toluidide

2. 3-hydroxyphenanthrene-2-carboxylic acid o-toluidide

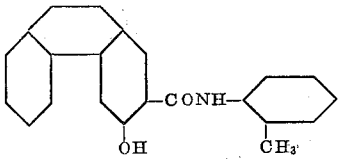

3. 2-hydroxy-11-benzo(α)carbazole-3-carboxyl-p-anisidide

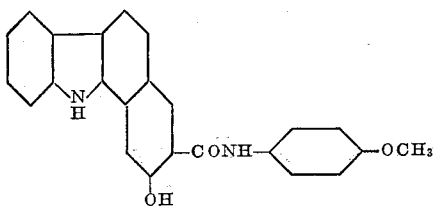

4. 2-hydroxy carbazole-3-carboxy-p-chloroanilide

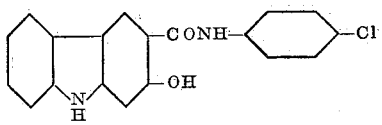

5. 3-hydroxy-2-anthracene carboxy-o-toluidide

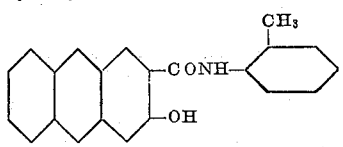

6. 11-hydroxytriphenylene-10-carboxylic acid o-anisidide

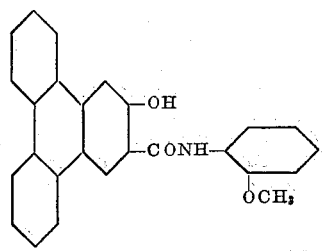

7. 3-hydroxyfluorene-2-carboxylic acid-5'-chloro-o-anisidide

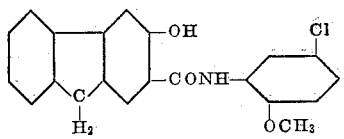

8. 2-hydroxydibenzo-furan-3-carboxylic acid-2'-5'-dimethoxy-anilide

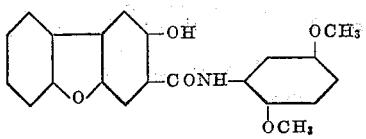

The following detailed examples will serve to further illustrate the invention, it being understood, however, that the invention is not limited thereto and that any of the above specifically defined arylamides or others of the class defining the coupling components of this invention may be substituted for the specific arylamide coupling components used in the examples. Unless otherwise specified, the quantities are given in parts by weight.

*Example 1*

A printing paste was prepared by mixing:

1.9 parts of the diazo amino compound obtained by condensing the diazo derivative of 5-chloro-2.4-dimethoxyaniline with sarcosine
2.2 parts of the 4-chloroanilide of 2-hydroxy-carbazole-3-carboxylic acid
4.0 parts of Cellosolve
24.0 parts of water
3.0 parts of sodium hydroxide solution 30%
65.0 parts of gum tragacanth.

Cotton and rayon piece goods were printed on an engraved roller with this printing paste. The printed material was dried and then treated in an ager for a short time with live steam containing the vapors of a mixture of acetic and formic acids. The developed prints were then soaped for five minutes in a boiling ½% soap solution, rinsed in clear water and dried. A deep bright yellowish-brown shade of good fastness properties was obtained. The formula of the developed color is:

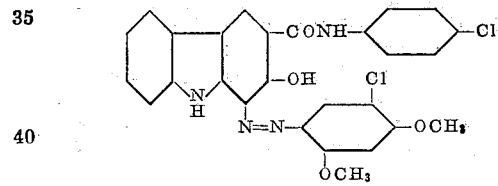

*Example 2*

A printing paste was prepared by mixing:

1.9 parts of the diazo amino compound obtained by condensing the diazo derivative of 5-chloro-2.4-dimethoxyaniline with sarcosine
2.1 parts of the o-toluidide of 2.3-hydroxy anthracene carboxylic acid
4.0 parts of Cellosolve
24.0 parts of water
3.0 parts of sodium hydroxide solution 30%
65.0 parts of gum tragacanth.

Cotton and rayon piece goods were printed on an engraved roller with this printing paste. The printed material was dried and then treated in an ager for a short time with live steam containing the vapors of acetic acid. The developed prints were then soaped for five minutes in a boiling ½% soap solution, rinsed in clear water and dried. A bright bluish-black shade of good fastness properties was obtained. The formula of the developed color is:

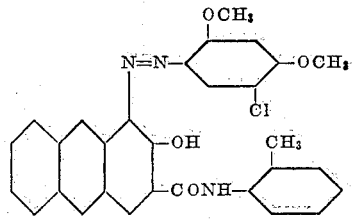

Example 3

Preparation of dyestuff in substance:

18.75 grams of 5-chloro-2.4-dimethoxyaniline are dissolved in
100 grams of water and
23 cc. of 21° Bé. hydrochloric acid.

This solution is cooled to —5° C. and diazotized with a solution of sodium nitrite containing 6.9 grams of 100% sodium nitrite. When diazotized, diatomaceous earth is added and the solution clarified. The diazo solution thus obtained is added to a buffered alkaline solution of 34 grams of 2-hydroxy-3-carbazolecarboxy-p-chloranilide.

Agitate until coupling is complete.

Acidify with hydrochloric acid, filter, wash acid free and dry. The product obtained is a brown pigment having very good fastness properties and is represented by the following chemical formula:

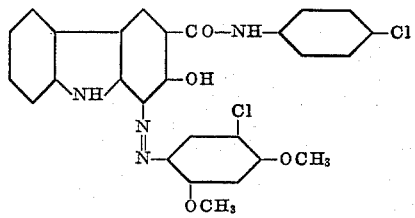

Example 4

Dissolve 22 grams of 5-choloro-2.4-diethoxyaniline in
100 grams of water and
23 cc. of 21° Bé. hydrochloric acid.

Cool to —5° C. and diazotize with a solution of sodium nitrite containing 6.9 grams 100% sodium nitrite. When diazotized add diatomaceous earth and clarify. Add the diazo solution thus obtained to a buffered alkaline solution of 34 grams of 2-hydroxy-3-carbazolecarboxy-p-chloranilide.

Acidify the coupling solution with hydrochloric acid, filter, wash acid free and dry.

The product thus obtained is a brown pigment having very good fastness properties and is represented by the following chemical formulas:

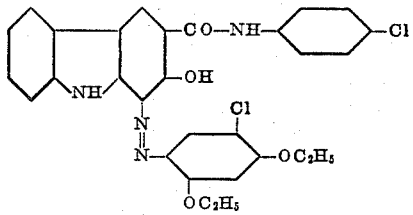

Example 5

Prepare the diazo of 5-chloro-2.4-dimethoxyaniline as in Example 3. Add the diazo solution to a buffered alkaline solution of 33 grams of 3-hydroxy-2-anthracenecarboxy-o-toluidide.

Agitate until coupling is complete.

Acidify the coupling solution with hydrochloric acid, filter, wash acid free and dry.

The dyestuff obtained is a green-black pigment of exceedingly good fastness properties which is represented by the following chemical formula:

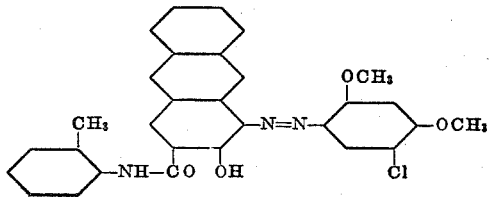

Example 6

Prepare the diazo of 5-chloro-2.4-dimethoxyaniline as in Example 3. Add the thus prepared diazo solution to a buffered alkaline solution of 38.2 grams of 2-hydroxy-11-benzo(α)carbazole-3-carboxy-p-anisidide.

Agitate until coupling is complete.

Acidify the coupling solution with hydrochloric acid, filter, wash acid free and dry.

The dyestuff obtained is a reddish-violet pigment of high tinctorial value and is represented by the following chemical formula:

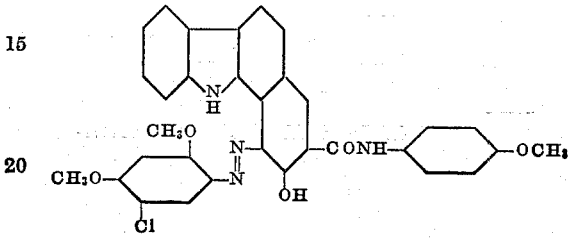

Example 7

Dissolve 20.4 grams 5-chloro-2-ethoxy-4-methoxyaniline in
100 grams of water and
23 cc. of 21° Bé. hydrochloric acid.

Cool this solution to —5° C. and diazotize with a solution of sodium nitrite containing 6.9 grams of 100% sodium nitrite; when diazotized add diatomaceous earth and clarify. Add this diazo solution to a buffered alkaline solution of 33 grams of 3-hydroxy-2-anthracenecarboxy-o-toluidide.

Agitate until coupling is complete.

Acidify with hydrochloric acid, filter, wash acid free and dry.

The obtained dyestuff is a green-black pigment having good fastness properties and is represented by the chemical formula:

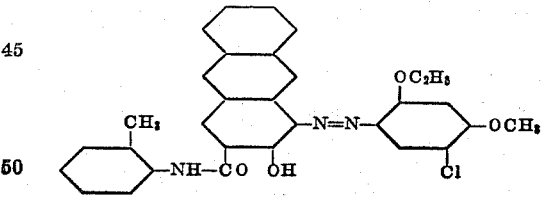

Example 8

Prepare the diazo of 5-chloro-2.4-dimethoxyaniline as in Example 3. Add the diazo solution to a buffered alkaline solution of 36.3 grams 2-hydroxydibenzofuran-3-carboxylic acid-2'.5'-dimethoxyanilide.

Agitate until coupling is complete.

Acidify the coupling solution with hydrochloric acid, filter, wash acid free and dry.

The dyestuff obtained has good fastness properties and is represented by the following chemical formula:

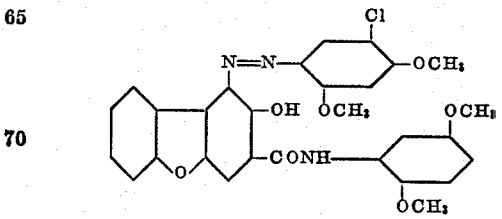

From the foregoing description and illustrative examples, it will be apparent to those skilled in the art that many and various embodiments of the invention may be made without departing from the spirit and scope thereof. It is understood that no limitations are intended except those which are specifically recited in the following claim or are imposed by the prior art.

I claim:

The azo dye compound represented by the formula:

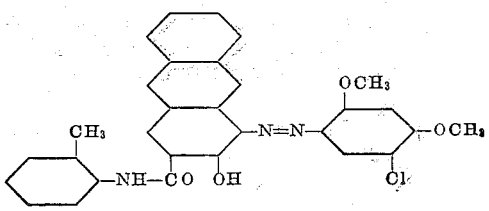

WILLIAM HENRY von GLAHN.

REFERENCES CITED

The following references are of record in the file of this patent:

UNITED STATES PATENTS

| Number | Name | Date |
|---|---|---|
| 1,872,033 | Grether | Aug. 16, 1932 |
| 1,917,443 | Gassner | July 11, 1933 |
| 2,026,908 | Muth | Jan. 7, 1936 |
| 2,028,469 | Neelmeier | Jan. 21, 1936 |
| 2,032,627 | Muth | Mar. 3, 1936 |
| 2,193,676 | Muth | Mar. 12, 1940 |

FOREIGN PATENTS

| Number | Country | Date |
|---|---|---|
| 336,369 | Italy | Feb. 15, 1936 |